United States Patent
Schilling et al.

(10) Patent No.: US 7,599,445 B2
(45) Date of Patent: Oct. 6, 2009

(54) DEVICE FOR TRANSMITTING DIGITAL SIGNALS BETWEEN MOBILE UNITS WITH MODIFICATION OF THE SPECTRAL CHARACTERISTICS

(75) Inventors: Harry Schilling, Eichstätt (DE); Nils Krumme, Feldafing (DE); Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 650 days.

(21) Appl. No.: 11/090,700

(22) Filed: Mar. 25, 2005

(65) Prior Publication Data

US 2005/0231836 A1 Oct. 20, 2005

Related U.S. Application Data

(63) Continuation of application No. PCT/EP03/10463, filed on Sep. 19, 2003.

(30) Foreign Application Priority Data

Sep. 27, 2002 (DE) ................................ 102 45 449

(51) Int. Cl.
*H04B 15/00* (2006.01)
(52) U.S. Cl. ...................... 375/285; 375/296
(58) Field of Classification Search ................ 375/219, 375/220, 229, 230, 232, 259, 285, 295, 296, 375/346
See application file for complete search history.

(56) References Cited

U.S. PATENT DOCUMENTS

| 5,400,322 | A | * | 3/1995 | Hunt et al. .................. 370/468 |
| 5,828,719 | A | * | 10/1998 | He et al. ....................... 378/4 |
| 6,246,698 | B1 | * | 6/2001 | Kumar ....................... 370/487 |
| 6,299,280 | B1 | | 10/2001 | Coudray et al. |
| 6,433,631 | B2 | | 8/2002 | Pearson, Jr. et al. |
| 2003/0099286 | A1 | * | 5/2003 | Graziano et al. ............ 375/222 |

FOREIGN PATENT DOCUMENTS

| DE | 196 44 503 | 5/1998 |
| DE | 19860909 | 9/1999 |

OTHER PUBLICATIONS

Lee et al., *Digital Communication*, 1990, Kluwer Academic Publishers, pp. 426-430.
International Search Report, PCT/EP03/10463, mailed Mar. 18, 2004.

* cited by examiner

*Primary Examiner*—David B Lugo
(74) *Attorney, Agent, or Firm*—Kevin L. Daffer; Daffer McDaniel, LLP

(57) ABSTRACT

A device for transmission of digital signals between two units movable relative to each other, particularly with non-contacting rotating data transmission devices, comprises an encoder on a transmitter side along a signal path for conforming a coding of the digital signals to transmission characteristic of a transmission path, so that a given spectral distribution of signals is attained. An optional decoder on a receiver side restores original signals, so that the coding remains concealed, but a substantially more reliable transmission is achieved.

11 Claims, 2 Drawing Sheets

DEVICE FOR TRANSMITTING DIGITAL SIGNALS BETWEEN MOBILE UNITS WITH MODIFICATION OF THE SPECTRAL CHARACTERISTICS

CROSS REFERENCE TO RELATED APPLICATIONS

This application is a continuation of pending International Application No. PCT/EP03/10463 filed Sep. 19, 2003, which designated the United States and claims priority from pending German Application No. 102 45 449.3 filed Sep. 27, 2002.

BACKGROUND OF THE INVENTION

1. Field of the Invention

The invention relates to rotating data transmission devices for transmitting digital signals between a plurality of units which are rotatable with respect to each other.

For the sake of clarity no distinction will be made in this document between a transmission between units that are movable relative to each other, and a transmission between a fixed unit and units movable with respect thereto, because this is only a matter of reference to location and does not affect the manner of operation of the invention. In the same way, no distinction is made between a transmission of signals and energy, because here the mechanisms of operation are the same.

2. Prior Art

With rotatable units such as radar installations or computer tomographs, and also with linearly movable units such as crane and conveyor systems, it is necessary to transmit electrical signals or energy between units movable relative to each other. For this, usually a conductor structure is provided in a first unit, and a corresponding tap in a second unit. In the following exposition the term conductor structures relates to all conceivable forms of conductor structures which are suitable for carrying electrical signals. It also relates to known contacting sliding tracks or slip rings. Of importance to a transmission by means of rotating data transmission devices or linear "slide contact lines" that may also be designed to be non-contacting, is the small distance of the transmission between the units that are movable relative to each other. Thus, a signal may be coupled out optionally by electrical contact, or within a near field of the conductor structures.

A device corresponding to this is described in the German Laid Open Print DE 44 12 958 A1. Here a signal to be transmitted is fed into a strip line on the first unit, that is disposed alongside a path of movement of the units which are movable relative to each other. The signal is tapped off from the second unit by means of capacitive or inductive coupling.

The coupling factor of a signal between the two units depends substantially on the distance of the two units from each other. Particularly for spatially extended transmission systems and especially at high speeds of movement, the distances between the movable units cannot be ascertained with any desired accuracy owing to mechanical tolerances. In practice the distances may vary in a range from direct contact up to a few centimeters, preferably between 0.01 mm and 10 mm. Therefore the coupling factor will frequently vary with the position of the two units with respect to each other, the speed (e.g. by causing vibrations), and other parameters of influence. At the same time the signal amplitude at the input of the receiver varies. This results in changes of the signal with conventionally constructed receivers, which will appear, for example, as an increased jitter, or even bit errors. Similarly, changes of the resistance to interference result.

An improvement of the transmission properties is provided by a device published in DE 197 00 110 A1, which has a conductor structure with filter properties, instead of a strip transmission line. Basically, however, the problems remain.

In U.S. Pat. No. 6,433,631 B2 a device for regulating the input level at a receiver is disclosed. For this, the signal amplitude outputted by a preamplifier is measured, and an attenuating member provided to precede the preamplifier is controlled according to this signal amplitude. The disadvantage of this arrangement is that with it only a signal having a constant amplitude is placed at the disposal of the receiver.

The disadvantage of the devices corresponding to prior art resides in an as yet inadequate resistance to interference. Thus, the transmitted signal levels in the line can be increased in order to improve the resistance to interference. With this, however, an undesired radiation of high-frequency signals increases. With a reduction of the transmitted signal levels, the radiation becomes less, but the immunity to interference scattered in from the outside also becomes less.

BRIEF SUMMARY OF THE INVENTION

The problem arises of designing a rotating data transmission device for electrical signals which avoids the above drawbacks and, in particular, has a high resistance to interference and therefore a high transmission quality of the signals. Another problem of the invention is that of providing a method for electrically transmitting broadband digital signals using the rotating data transmission device.

In accordance with the invention the first of the above problems is solved with a rotating data transmission device for electrical transmission of broadband digital signals between at least one first unit and at least one second unit disposed to be rotatable relative to the first unit, the at least one first unit comprising:

a data source for generating a serial data stream;
a transmitter for generating electrical signals from the serial data stream of the data source; and
a transmission conductor structure for carrying the electrical signals generated by the transmitter;

and the at least one second unit comprising:

a receiving antenna for tapping-off electrical signals in a near field of the transmission conductor structure;
a receiver for receiving signals tapped-off by the receiving antenna; and
a data sink for further processing the signals received by the receiver;

wherein the first unit further comprises:

an encoder provided between the data source and the transmitter for digitally encoding the data stream and converting the digitally encoded data stream so that a power of electrical signals generated by the transmitter in given spectral ranges is optionally increased or lowered; and the second unit further comprises:

a decoder provided between the receiver and the data sink for restoring, from signals of data encoded by the encoder and received by the receiver, data in an original form as issued by the data source.

In accordance with the invention the first of the above problems is also solved with a rotating data transmission device for electrical transmission of broadband digital signals between at least one first unit and at least one second unit disposed to be rotatable relative to the first unit, the at least one first unit comprising:

a data source for generating a serial data stream;

a transmitter for generating electrical signals from the serial data stream of the data source; and a transmission conductor structure for carrying the electrical signals generated by the transmitter;

and the at least one second unit comprising:

a receiving antenna for tapping-off electrical signals in a near field of the transmission conductor structure;

a receiver for receiving signals tapped-off by the receiving antenna; and a data sink for further processing the signals received by the receiver;

wherein at least one filter, assigned optionally to the transmitter or the receiver, is provided to effect matching to transmission characteristics of a data path between the transmitter and the receiver.

In accordance with the invention the second of the above problems is solved with a method for electrically transmitting broadband digital signals between at least one first unit and at least one second unit disposed to be rotatable relative to the first unit in a rotating data transmission device, comprising the steps of:

generating a serial data stream from a data source on the at least one first unit;

generating electrical signals from the serial data stream with a transmitter on the at least one first unit; and carrying the electrical signals generated by the transmitter in a transmission conductor structure on the at least one first unit; and tapping-off electrical signals in a near field of the transmission conductor structure with a receiving antenna on the at least one second unit;

receiving signals tapped-off by the receiving antenna with a receiver on the at least one second unit; and further processing the signals received by the receiver in a data sink on the at least one second unit;

the method comprising the further steps of:

encoding the signals to be transmitted on the at least one first unit so that a spectral power density of the signals is optionally increased or decreased in given spectral ranges; and decoding the signals received on the at least one second unit to restore data in an original form as issued by the data source.

A device in accordance with the invention serves for transmitting digital signals between at least two units that are rotatable relative to each other, preferably as a rotating data transmission device, as employed for example in computer tomographs. Of course, one or a plurality of units may be disposed on each side of the movement. For simplification of the representation, reference is here made exclusively to a second unit that is rotationally movable relative to a first unit.

BRIEF DESCRIPTION OF THE DRAWINGS

In the following the invention will be described by way of example, without limitation of the general inventive concept, on examples of embodiment with reference to the drawings.

DETAILED DESCRIPTION OF PREFERRED EMBODIMENTS

Figure 1:
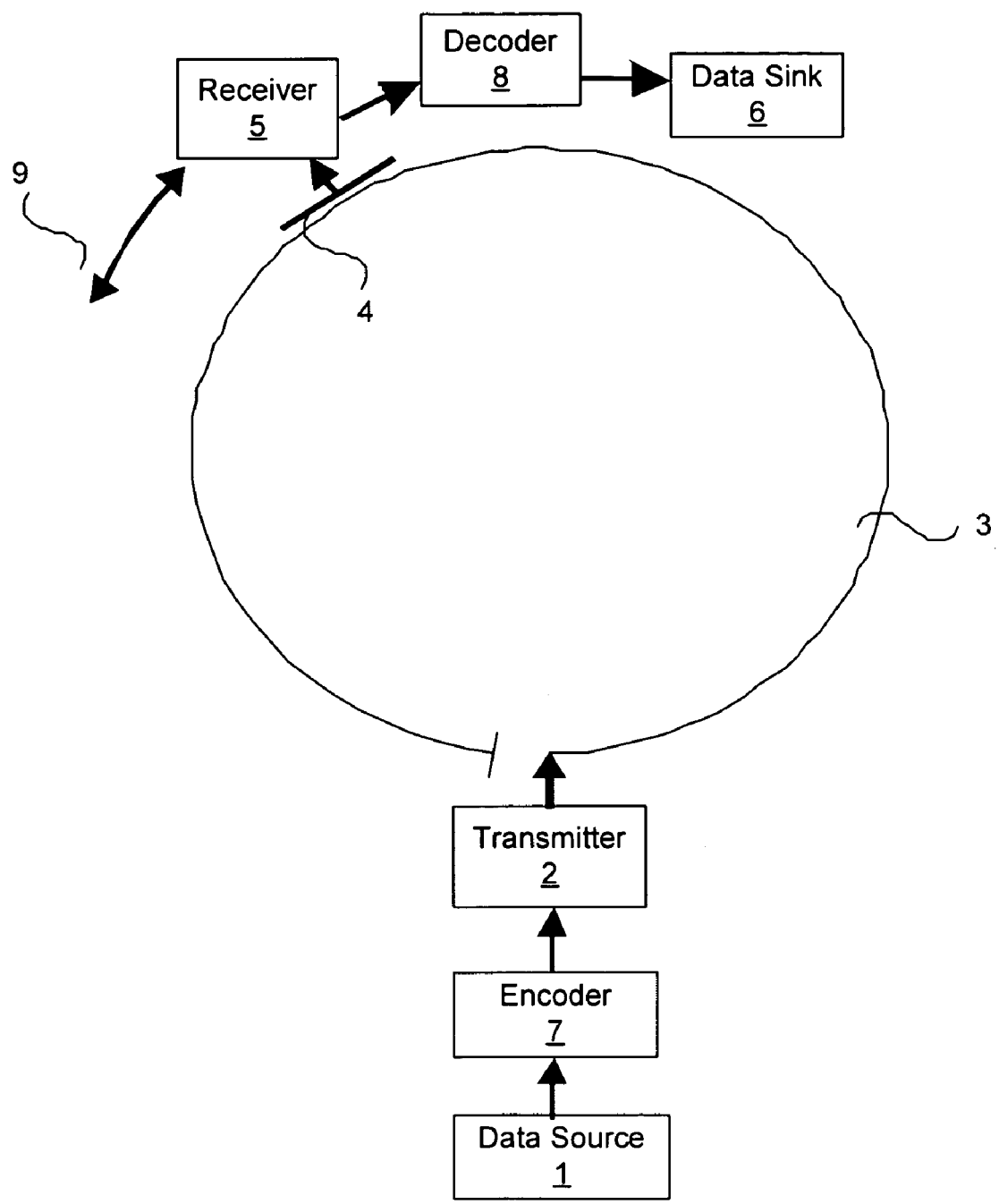
FIG. 1 schematically shows in general form a rotating data transmission device in accordance with the invention.

In FIG. 1 a particularly advantageous embodiment of a rotating data transmission device in accordance with the invention is illustrated. Data of a data source 1 are transmitted via an encoder 7 and a transmitter 2 to a transmission conductor structure 3 of circular configuration. The transmission conductor structure is disposed along a path of movement indicated by a directional arrow 9, and carries the signals fed in from the transmitter. A receiving antenna 4 makes it possible to tap-off signals of a near field of the transmission conductor structure. The signals tapped-off by the antenna are conducted via a receiver 5 and a decoder 8 to a data sink 6.

Figure 2:
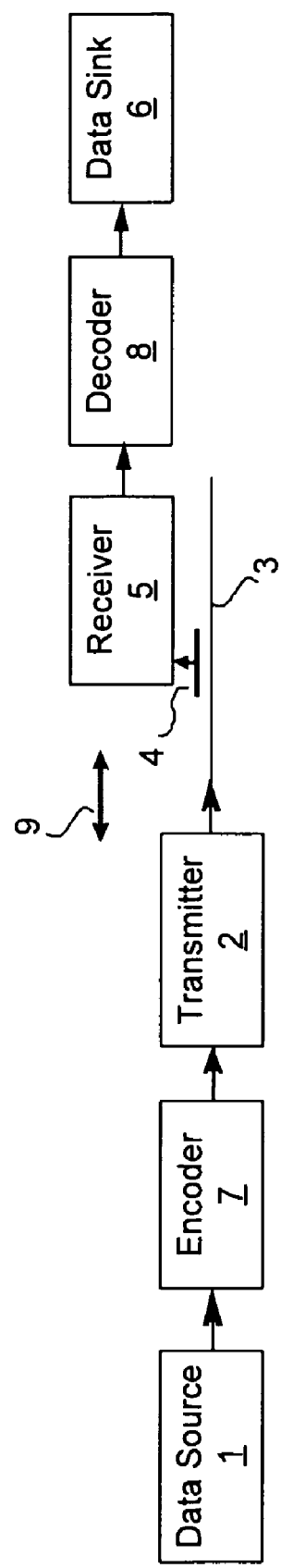
FIG. 2 schematically shows in general form a device for linear transmission in accordance with the invention.

FIG. 2 shows a device for linear transmission. As the geometry of the transmission means or of the track of movement basically does not affect the configuration used in the invention, the reference symbols correspond to those of FIG. 1.

A data source 1 for generating a serial data stream, such as, for example, a prior art parallel/series converter is assigned to the first unit. Furthermore, a transmitter 2 is provided for generating electrical signals from the serial data stream of the data source for transmission via a transmission conductor structure 3. A receiving antenna 4 for tapping off electrical signals in the near field of the transmission conductor structure is assigned to the second unit. The electrical signals of the receiving antenna are supplied to a data sink 6 via a receiver 5 for further processing of the signals.

Now, according to the invention an encoder 7 is provided between the data source 1 and the transmitter 2. This encoder is adapted to convert the digital encoding of the data stream so that the data can be transmitted via the transmitter 2, the transmission conductor structure 3, the receiving antenna 4 and also the receiver 5 with a minimum of errors.

According to the nature of the invention, the encoder is provided in the electrical signal path between the data source 1 and the transmitter 2. Of course, this encoder may also be disposed in the transmitter 2.

Furthermore, a decoder 8 for decoding the signals encoded by the encoder 7 is assigned to the second unit between the receiver 5 and the data sink 6. With this decoder the encoding operation of the encoder is reversed, so that the signals supplied to the data sink correspond to the data stream of the data source 1. Of course, the decoder can also be disposed in the receiver 5. Thus, for optimum transport of the data along the data path, the coding is completely transparent for the data source or the data sink.

According to the invention, a conversion of the spectral properties of the data stream is effected by the encoding of the data stream by means of the encoder 7. Thus, the encoding is effected in such manner that the power of the signal in given spectral ranges is optionally increased or decreased. By a conformation of the spectral properties of the signals, the transmission quality can be conformed to the frequency response of the remaining transmission path, and also to any interference sources or components susceptible to interference that may be present.

If the data path between the transmitter and the receiver has a particularly high attenuation, for example in one or a plurality of known frequency ranges, then the encoding can now be designed advantageously so that this frequency range is not used for transmission. In the opposite case of frequency ranges having a particularly low attenuation, a maximum can be placed within these frequency ranges by suitable encoding.

If external interference sources impairing the transmission of the signals are present, then the encoding is effected in advantageous manner so that optionally these frequency ranges are not used. As an alternative to this, an especially high amplitude could be emitted within these frequency ranges.

If components particularly susceptible to interference are present outside the data path, then the spectrum of the transmitted signal can be conformed by the encoding so that only signals of low levels are emitted in the frequency ranges of high susceptibility to interference. Basically, it is here also possible to broaden the known line spectrum of digital signals with a suitable encoding, in order to meet the limiting values measured in accordance with valid EMC Standards.

The encoding is effected in advantageous manner so that the transmitted signal is free from d.c.

In another embodiment of the invention the kind of encoding can be set dynamically, so that in advantageous manner it can adapt to changes caused by the movement. For this, advantageously a control unit with means for determining the current operational condition and correspondingly presetting the coding for the encoder is provided. Thus, for example, the coding may be preset in dependence upon position. A position sensor could signal the relative position of the units rotatable with respect to each other and preset a suitable coding. Similarly, a time-dependent coding can be preset. This is of particular advantage with a constant speed of rotation, because here again an assignment to the position is possible.

Another embodiment of the invention provides for the encoding function of the encoder to be varied in dependence upon time, in order to compensate for the effects of time-dependent interference sources. Thus, for example, encoding may be adapted according to the interference peaks of a current supply, an X-ray tube or an electric motor.

Another embodiment of the invention provides for the coding operation of the encoder to be adapted in dependence upon electrical measurement parameters. Thus, for example, a measurement parameter may be determined according to an interference level of the transmission means. This measurement parameter can now optionally be utilized, analogously to conforming particular spectral components, so that amplitudes of spectral components of a wanted signal transmitted in frequency ranges subject to interference are increased. Similarly, this measurement parameter may be utilized for signaling a shift of spectral components of the wanted signal into ranges not subject to interference. Furthermore, the measurement parameter may be also utilized for effecting a switch-over to a different spectral amplitude distribution of the wanted signal.

According to the invention a dynamic adaptation may be effected at the beginning of a transmission, the adaptation or settings performed at the beginning being maintained for the duration of the transmission. Similarly, dynamic adaptation during the entire duration of the transmission is also possible.

In another embodiment of the invention the encoder is adapted to introduce additional redundancy into the data stream. In the case of transmission errors, further corrections of the information of the data stream are made possible by this additional redundancy. These corrections may now be performed optionally by the data sink, but preferably by a decoder.

In another embodiment of the invention the encoder is adapted to increase the data rate of the serial data stream and therewith create space for additional redundant information. In an advantageous manner this conversion of the data rate, or optionally a previously described conversion of the coding or the packet information, is effected by converting the serial data stream of the data sources to parallel data words that may be modified easily, and also by a subsequent conversion to a changed serial data stream for transmission.

Another device according to the invention comprises an encoder which encodes or enciphers signals to be transmitted in order to increase security. For this, in accordance with the security requirements, a shorter or longer key can be used. Suitable means for deciphering can then be provided optionally in the data sink or in the decoder.

Another embodiment of the invention provides that means for timing recovery be provided optionally in the encoder 7 or the decoder 8. Furthermore, means for timing recovery may be provided at an optional place along the data path. By means of the timing recovery of a signal a synchronization of the signal with a timing of constant frequency is effected, which is usually obtained from the data stream with the aid of a PLL. The profile of the signal can be substantially improved thereby. Thus, the regenerated signal will again have clear slopes with reduced jitter, and thus an increased opening of eye pattern.

In another embodiment of the invention at least one filter is assigned optionally to the transmitter 2 or the receiver 5. This filter serves to effect matching to the transmission characteristics of the data path between the transmitter and the receiver. Thus, frequency-dependent amplitude and phase responses can be corrected, particularly on the receiver side. In addition, external interference can be reduced with filters of this kind.

Another advantageous embodiment of the invention consists in the filter being dynamically adjustable. Particularly with movable units, the transmission characteristic changes dynamically during a movement. This can be compensated by dynamic filter adjustment. A filter of this kind can be controlled, for example, by a microcontroller or by a simple automatic control circuit.

In another advantageous embodiment the device is designed to be self-learning or adaptive. This means that it adapts to operating states dynamically, in particular during movement. This can be effected, for example, by determining certain operating parameters such as bit error rate, signal amplitude etc., and subsequently adjusting the encoder, or the decoder, or the filters. It is therefore particularly expedient to use a fuzzy logic controller here. Thus, for example, the redundancy or the data rate can be set as a function of the transmission errors. This means that with a large number of transmission errors, a higher redundancy, for example, is provided. Particularly with rotating movements, and especially at constant speed, it is of advantage to store the transmission function via the rotation, and to perform an adjustment of the encoder, or the decoder, or the filters in suitable dependence on time or position. Of course, this is possible also for linear movements, provided that information on the position is available.

A method of the invention for broadband transmission of digital signals using a device according to the invention provides for the signals to be digitally encoded so that the spectral power density of the signals in given spectral regions is optionally raised or lowered.

The invention claimed is:

1. Rotating data transmission device for electrical transmission of broadband digital signals between at least one first unit and at least one second unit disposed to be rotatable relative to the first unit, wherein:
   the at least one first unit comprises;
      a data source for generating a serial data stream;
      a transmitter for generating electrical signals from the serial data stream of the data source;
      a transmission conductor structure for carrying the electrical signals generated by the transmitter;
   the at least one second unit comprises:
      a receiving antenna for tapping-off electrical signals in a near field of the transmission conductor structure;
      a receiver for receiving signals tapped-off by the receiving antenna;

a data sink for further processing the signals received by the receiver;

wherein the first unit further comprises:

an encoder provided between the data source and the transmitter for digitally encoding the serial data stream so that a power of the electrical signals generated by the transmitter in given spectral ranges is either increased or lowered, wherein an encoding function of the encoder is dynamically adjusted as a function of a location of a rotary movement of the two units relative to each other; and wherein the second unit further comprises:

a decoder provided between the receiver and the data sink for restoring, from signals of data encoded by the encoder and received by the receiver, data in an original form as issued by the data source.

2. Device according to claim 1, wherein the encoding function of the encoder is adapted to be adjusted dynamically as a function of time.

3. Device according to claim 1, wherein the encoding function of the encoder is adapted to be adjusted dynamically as a function of an electrical measurement parameter signaling electrical levels, in particular interference levels, in at least one of the transmission conductor structure, the receiving antenna, and the receiver.

4. Device according to claim 1, wherein the encoder is adapted to introduce additional redundancy into the data stream.

5. Device according to claim 1, wherein the encoder is adapted to increase or decrease a data rate of the serial data stream generated by the data source.

6. Device according to claim 1, wherein the encoder comprises means for enciphering the serial data stream of the data source.

7. Device according to claim 1, wherein the encoder or the decoder further comprises means for timing recovery.

8. Device according to claim 1, wherein the device is self-learning and dynamically adapts to prevailing operating states.

9. Rotating data transmission device for electrical transmission of broadband digital signals between at least one first unit and at least one second unit disposed to be rotatable relative to the first unit, wherein:

the at least one first unit comprises:

a data source for generating a serial data stream;

a transmitter for generating electrical signals from the serial data stream of the data source; and a transmission conductor structure for carrying the electrical signals generated by the transmitter;

the at least one second unit comprises:

a receiving antenna for tapping-off electrical signals in a near field of the transmission conductor structure;

a receiver for receiving signals tapped-off by the receiving antenna;

a data sink for further processing the signals received by the receiver; and wherein at least one filter, assigned optionally to the transmitter or the receiver, is provided to effect matching to transmission characteristics of a data path coupled between the transmitter and the receiver, wherein the filter is dynamically adjustable, and wherein the dynamic adjustment is provided as a function of a location of a rotary movement of the two units relative to each other.

10. Device according to claim 9, wherein the device is self-learning and dynamically adapts to prevailing operating states.

11. Method for electrically transmitting broadband digital signals between at least one first unit and at least one second unit disposed to be rotatable relative to the first unit in a rotating data transmission device, comprising the steps of:

generating a serial data stream from a data source on the at least one first unit;

generating electrical signals from the serial data stream with a transmitter on the at least one first unit;

carrying the electrical signals generated by the transmitter in a transmission conductor structure on the at least one first unit;

tapping-off electrical signals in a near field of the transmission conductor structure with a receiving antenna on the at least one second unit;

receiving signals tapped-off by the receiving antenna with a receiver on the at least one second unit;

further processing the signals received by the receiver in a data sink on the at least one second unit;

the method comprising the further steps of:

encoding the signals to be transmitted on the at least one first unit so that a spectral power density of the signals is either increased or decreased in given spectral ranges, wherein the encoding of signals is adjusted dynamically as a function of location of a rotary movement of the two units relative to each other; and decoding the signals received on the at least one second unit to restore data in an original form as issued by the data source.

* * * * *